(12) United States Patent
Hayes

(10) Patent No.: US 9,738,394 B2
(45) Date of Patent: *Aug. 22, 2017

(54) SYSTEMS AND METHODS FOR FUEL MONITORING

(71) Applicant: Insitu, Inc., Bingen, WA (US)

(72) Inventor: Andrew Royds Hayes, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/975,112

(22) Filed: Dec. 18, 2015

(65) Prior Publication Data

US 2016/0101872 A1    Apr. 14, 2016

Related U.S. Application Data

(63) Continuation of application No. 14/453,528, filed on Aug. 6, 2014, now Pat. No. 9,248,915.

(Continued)

(51) Int. Cl.
| | |
|---|---|
| *G01C 23/00* | (2006.01) |
| *B64C 13/20* | (2006.01) |
| *B65B 1/30* | (2006.01) |
| *B64D 37/00* | (2006.01) |
| *B64C 19/00* | (2006.01) |

(Continued)

(52) U.S. Cl.
CPC ............ *B64D 37/005* (2013.01); *B64C 19/00* (2013.01); *B64C 39/00* (2013.01); *B64C 39/024* (2013.01); *B64D 45/00* (2013.01); *G08G 1/205* (2013.01); *G08G 5/0013* (2013.01); *G08G 5/0069* (2013.01); *B64C 2201/146* (2013.01)

(58) Field of Classification Search
USPC ................................. 701/3; 244/190; 141/95
See application file for complete search history.

(56) References Cited

U.S. PATENT DOCUMENTS 7,437,225 B1 * 10/2008 Rathinam ............ G08G 5/0013
                                                    340/961
8,234,068 B1    7/2012 Young et al.
(Continued)

FOREIGN PATENT DOCUMENTS

| EP | 0743580 A1 | 11/1996 |
|---|---|---|
| EP | 2163849 A2 | 3/2010 |

OTHER PUBLICATIONS

International Patent Application No. PCT/US2014/052742; Int'l Preliminary Report on Patentability; dated Mar. 10, 2016; 7 pages.

(Continued)

*Primary Examiner* — Tyler Paige
(74) *Attorney, Agent, or Firm* — Baker & Hostetler LLP

(57) ABSTRACT

A zero fuel time is determined and presented to an operator of an unmanned aerial vehicle (UAV). Zero fuel time may be determined based on a fuel burn rate and an amount of remaining fuel. A return to base time is determined and presented to an operator of a UAV. Return to base time may be determined based on a location of the UAV and a location of a base. Zero fuel time and return to base time are presented to an operator of a UAV proximate to one another using contrasting and/or varying visual characteristics to ease comparison and identification of this data.

20 Claims, 5 Drawing Sheets

Related U.S. Application Data

(60) Provisional application No. 61/872,430, filed on Aug. 30, 2013.

(51) Int. Cl.
  *B64C 39/00* (2006.01)
  *B64D 45/00* (2006.01)
  *G08G 5/00* (2006.01)
  *B64C 39/02* (2006.01)
  *G08G 1/00* (2006.01)

(56) References Cited

U.S. PATENT DOCUMENTS

| | | | |
|---|---|---|---|
| 8,977,481 B1 | 3/2015 | Downs | |
| 9,248,915 B2* | 2/2016 | Hayes | B64D 45/00 |
| 2005/0004723 A1* | 1/2005 | Duggan | G05D 1/0061 |
| | | | 701/24 |
| 2009/0108140 A1 | 4/2009 | Adams et al. | |
| 2009/0219393 A1* | 9/2009 | Vian | G07C 5/008 |
| | | | 348/144 |
| 2010/0087980 A1 | 4/2010 | Spura | |
| 2010/0122750 A1* | 5/2010 | Erben | B64F 1/28 |
| | | | 141/95 |
| 2010/0268409 A1* | 10/2010 | Vian | G05D 1/104 |
| | | | 701/24 |
| 2011/0264314 A1* | 10/2011 | Parras | G05D 1/0676 |
| | | | 701/16 |
| 2011/0266394 A1* | 11/2011 | Erben | B64D 37/00 |
| | | | 244/135 B |
| 2012/0130701 A1 | 5/2012 | Khella | |
| 2013/0179059 A1 | 7/2013 | Otto et al. | |
| 2014/0025228 A1* | 1/2014 | Jang | G06Q 10/047 |
| | | | 701/2 |

OTHER PUBLICATIONS

International Patent Application No. PCT/US2014/052742; Int'l Search Report and the Written Opinion; dated Jan. 23, 2015; 10 pages.

* cited by examiner

SYSTEMS AND METHODS FOR FUEL MONITORING

CROSS-REFERENCE TO RELATED APPLICATIONS

This application is a continuation of U.S. patent application Ser. No. 14/453,528, filed Aug. 6, 2014, which claims priority to U.S. Provisional Patent Application No. 61/872,430, filed Aug. 30, 2013, the contents of which are incorporated herein by reference in their entireties.

BACKGROUND

Unmanned aerial vehicles (UAVs) are aircraft with no human pilot onboard that are often operated with assistance from ground-based personnel and/or systems. The use of UAVs has been increasing as the need for such aircraft grows and advances in UAV technology make UAVs more capable and less expensive. Applications of UAVs include use both military applications and civilian applications such as policing, firefighting, and surveillance. UAVs powered by internal combustion engines carry their own fuel supply that is necessarily limited. Operators of UAVs have to estimate remaining flight time for an operating UAV based on the amount of fuel remaining onboard the UAV and the rate of fuel consumption, which may be estimated using various methods.

SUMMARY

Illustrative examples of the present invention include, without limitation, a method, system, and computer-readable storage medium. In one aspect, a zero fuel time is determined and presented to an operator of a UAV. Zero fuel time may be calculated by determining a fuel burn rate and dividing an amount of remaining fuel by the determined fuel burn rate. In another aspect, a return to base time is determined and presented to an operator of a UAV. Return to base time may be calculated by determining a current distance from a UAV to a base and determining how long the UAV may loiter at its current location before it must start a flight to return to base in order to not run out of fuel before reaching the base. In another aspect, zero fuel time and return to base time are presented to an operator of a UAV proximate to one another to allow for easy comparison of these two times. Zero fuel time and return to base time may be presented using contrasting and/or varying visual characteristics to ease comparison and identification of this data.

Other features of the inventive systems and methods are described below. The features, functions, and advantages can be achieved independently in various examples or may be combined in yet other examples, further details of which can be seen with reference to the following description and drawings.

BRIEF DESCRIPTION OF THE DRAWINGS

Examples of techniques in accordance with the present disclosure are described in detail below with reference to the following illustrations.

DETAILED DESCRIPTION

Figure 1:
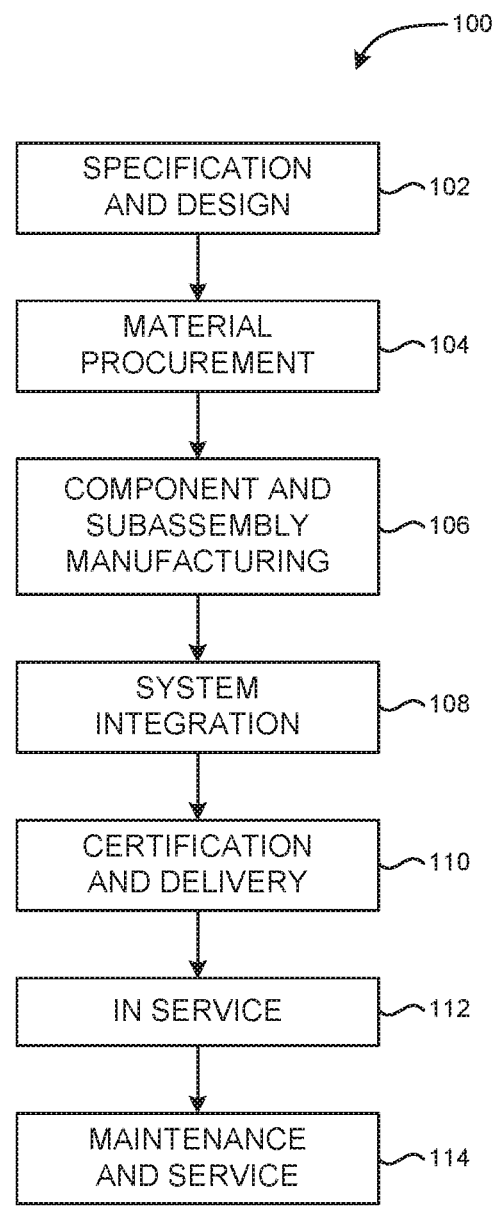
FIG. 1 depicts a flow diagram of an aircraft production and service methodology.
Figure 2:
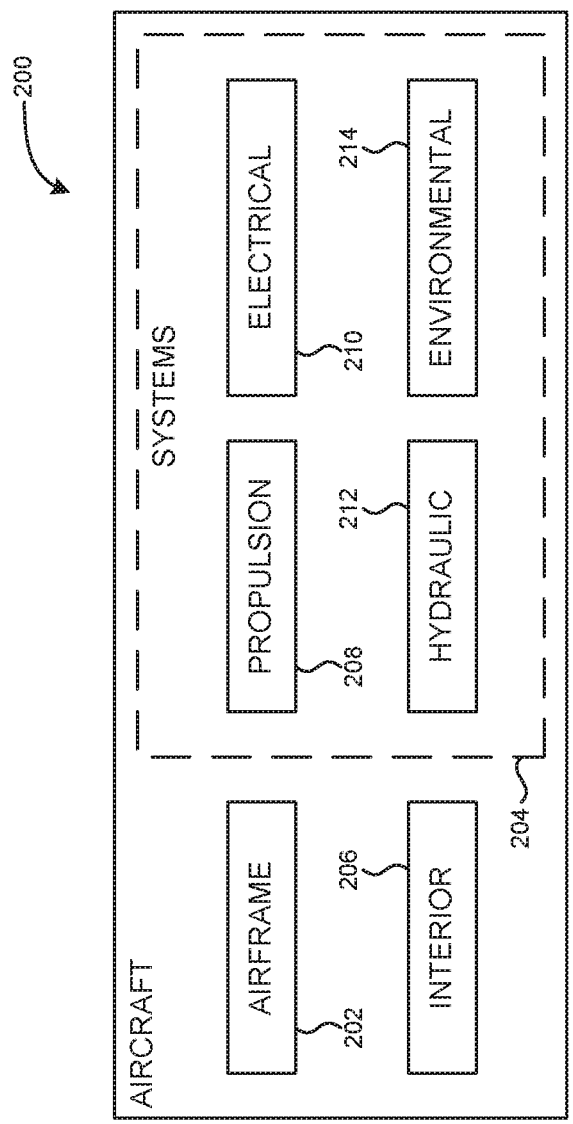
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 may take place. Thereafter, aircraft 200 may go through certification and delivery 110 in order to be placed in service 112. While in service by a customer, aircraft 200 may be scheduled for routine maintenance and service 114, which may also include modification, reconfiguration, refurbishment, and so on.

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors. A third party may include, for example and without limitation, any number of venders, subcontractors, and suppliers. An operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus, systems, and methods disclosed herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
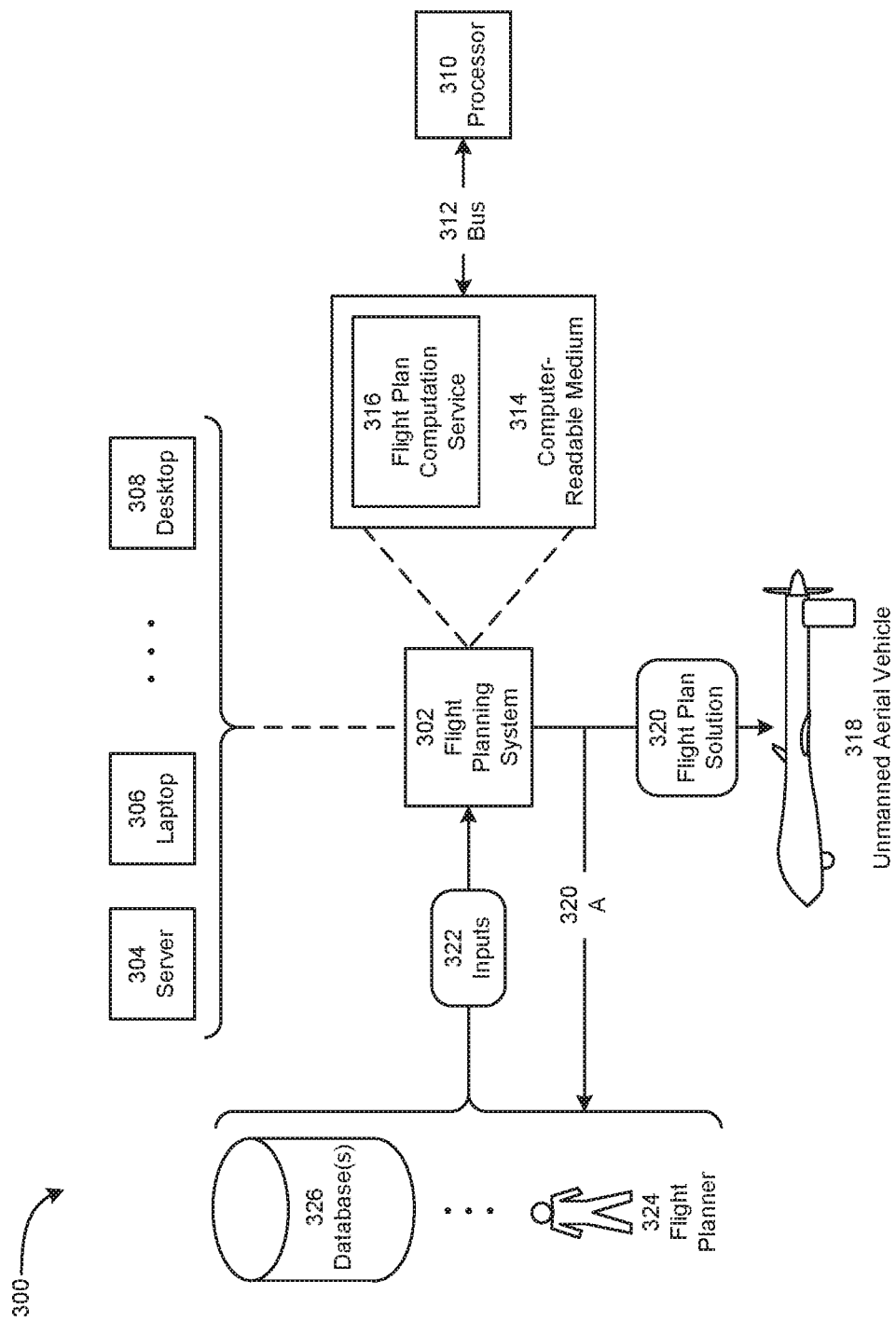
FIG. 3 depicts a block diagram illustrating systems or operating environments for controlling unmanned aerial vehicles (UAVs).

FIG. 3 illustrates systems or operating environments, denoted generally at 300, that provide flight plans for UAVs while routing around obstacles having spatial and temporal dimensions. These systems 300 may include one or more flight planning systems 302. FIG. 3 illustrates several examples of platforms that may host flight planning system 302. These examples may include one or more server-based systems 304, one or more portable computing systems 306 (whether characterized as a laptop, notebook, tablet, or other type of mobile computing system), and/or one or more desktop computing systems 308. Flight planning system 302 may be a ground-based system that performs pre-flight planning and route analysis for a UAV or a vehicle-based system that is housed within an UAV.

Implementations of this description may include other types of platforms as well, with FIG. 3 providing some non-limiting examples. For example, the description herein contemplates other platforms for implementing the flight planning systems, including, but not limited to, wireless personal digital assistants, smartphones, or the like. The graphical elements used in FIG. 3 to depict various components are chosen only to facilitate illustration and not to limit possible implementations of the description herein.

Turning to flight planning system 302 in more detail, it may include one or more processors 310 that each may have a particular type or architecture that may be chosen based on an intended implementation. Processors 310 may couple to one or more bus systems 312 that are chosen for compatibility with processors 310.

The flight planning system 302 may include one or more instances of computer-readable storage media 314 that couple to the bus systems 312. Bus systems 312 may enable processors 310 to read code and/or data to/from the computer-readable storage media 314. Storage media 314 may represent storage elements implemented using any suitable technology, including, but not limited to, semiconductors, magnetic materials, optics, or the like. Storage media 314 may include memory components, whether classified as RAM, ROM, flash, or other types, and may also represent hard disk drives.

Storage media 314 may include one or more modules 316 of instructions that, when loaded into one or more of processors 310 and executed, cause flight planning system 302 to provide flight plan computation services for one or more UAVs 318. These modules may implement the various algorithms and models described and illustrated herein.

UAVs 318 may be of any size and/or type and may be designed for different applications. In different scenarios, the UAVs may range from relatively small drones to relatively large transport aircraft. Accordingly, the graphical illustration of UAV 318 as shown in FIG. 3 is representative only, and is not drawn to scale.

Flight plan computation services provided by one or more of modules 316 may generate respective flight plan solutions 320 for UAV 318 based on inputs 322, with flight planning personnel 324 and/or one or more databases 326 providing inputs 322.

Assuming that the flight plan services 316 define one or more solutions 320, flight planning system 302 may load the solutions into UAV 318, as represented by the arrow connecting block 320 and UAV 318 in FIG. 3. In addition, flight planning system 302 may also provide solutions 320 to flight planning personnel 324 and/or databases 326, as denoted by the arrow 320A.

An amount of remaining flight time for a UAV may be determined by performing calculations based on an amount of fuel remaining onboard the UAV and estimates of burn rates based on any number of factors, such as flight speed, weather conditions, altitude, etc. This remaining flight time may be referred to as "zero fuel time". In an example, rather than an operator, such as flight planning personnel 324, performing the calculations manually to determine fuel time for a UAV, zero fuel time may be calculated automatically, and in some examples, continuously or in real-time or near real-time. For example, modules 316 may include one or more modules that include instructions that accept as inputs various variables that reflect conditions and statuses of a UAV and its components. Such variables may reflect, without limitation, an amount of fuel remaining onboard, flight speed, altitude, engine operating conditions, etc. These variables may then be used by modules 316 to calculate a burn rate of fuel which may be used to determine a zero fuel time. In an example, zero fuel time is calculated by dividing an amount of remaining fuel by a burn rate. Zero fuel time information may then be presented to flight planning personnel 324, for example via one or more of server 304, laptop 306, and desktop 308. By having fuel time data readily at hand, flight planning personnel 324 may more quickly make determinations of which additional activities, if any, a UAV may perform.

In an example, flight planning personnel 324 may also find it helpful to have an estimate of an amount of time that UAV 318 can continue to operate before it has to return to a ground base for refueling ("return to base time"). For example, flight planning personnel 324 may need to know how long they can instruct UAV 318 to perform functions and activities before it must return to a base for additional fuel. In such an example, modules 316 may include one or more modules that include instructions that accept as inputs various variables that reflect conditions and statuses of a UAV and its components as well as mapping data that lets modules 316 calculate a path and distance to a ground base and estimate an amount of time remaining before a UAV must return to the ground base. Such variables may reflect, without limitation, an amount of fuel remaining onboard, flight speed, altitude, engine operating conditions, current coordinates of UAV 318, coordinates of one or more ground bases, etc. These variables may then be used by modules 316 to calculate a burn rate of fuel and an estimate of a time required to return to a ground base. Using this information, modules 316 may then estimate a point in time at which UAV 318 must begin its return flight to the ground base. In an example, return to base time may be calculated by determining a current distance from a UAV to a base and determining how long the UAV may loiter at its current location before it must start a flight to return to base in order to not run out of fuel before reaching the base. As may be appreciated, return to base time information may be most useful when updated continuously or in real-time or near real-time as it may change as the UAV flies, for example, farther or closer to the ground base in the course of performing its activities and functions. Return to base time may be presented to flight planning personnel 324, for example via one or more of server 304, laptop 306, and desktop 308. By having return to base time data readily at hand, flight planning personnel 324 may more quickly make determinations of which additional activities, if any, a UAV may perform.

Figure 4:
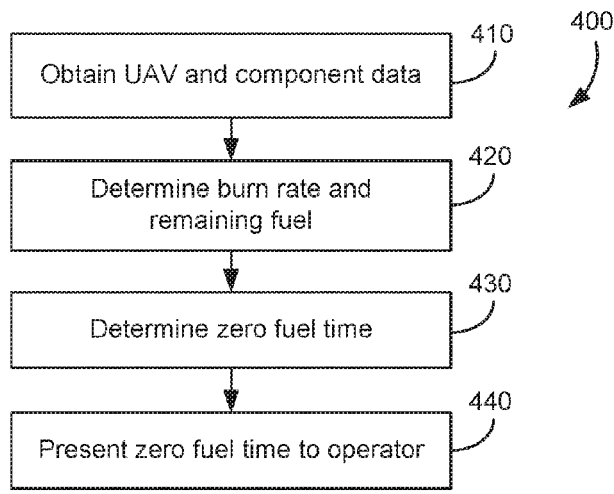
FIG. 4 depicts an illustration of operations performed by one example of the disclosed subject matter.

FIG. 4 illustrates exemplary, non-limiting method 400 of implementing an example of the subject matter disclosed herein. Method 400, and the individual actions and functions described in method 400, may be performed by any one or more devices, including those described herein. In an example, method 400 may be performed by a device or system such as flight planning system 302, on a system configured at a ground station, and/or at a system configured at a UAV, in some examples in conjunction with software configured and/or executing on such a device or system. Note that any of the operations, functions, and actions described in regard to any of the blocks of method 400 may be performed in any order, in isolation, with a subset of other functions and/or actions described in regard to any of the other blocks of method 400 or any other method described herein, and in combination with other functions and/or actions, including those described herein and those not set forth herein. Processor-executable instructions for performing some or all of method 400 may be stored in a memory or other storage device accessible by a processor, such as any processor described herein or otherwise, and may be executed by such a processor to create a device implementing an example of the present disclosure. All such examples are contemplated as within the scope of the present disclosure.

At operation 410, a system performing method 400 may obtain UAV data, which may include data obtained from or relating to one or more components of a UAV, such as an amount of fuel remaining onboard the UAV, flight speed, altitude, engine operating conditions, etc. This data may be obtained using any means, including polling or otherwise requesting the data from the UAV and/or its components, receiving such data from the UAV and/or its components that may be configured to automatically provide such data, or any combination thereof. At operation 420, using the data obtained at operation 410, a burn rate and remaining fuel may be determined. Any other calculations or determinations that may be performed to determine a zero fuel time may also be performed at operation 420. At operation 430, a zero fuel time may be determined, for example, by dividing an amount of remaining fuel by a burn rate. At operation 440, the zero fuel time may be presented to an operator of the UAV.

Figure 5:
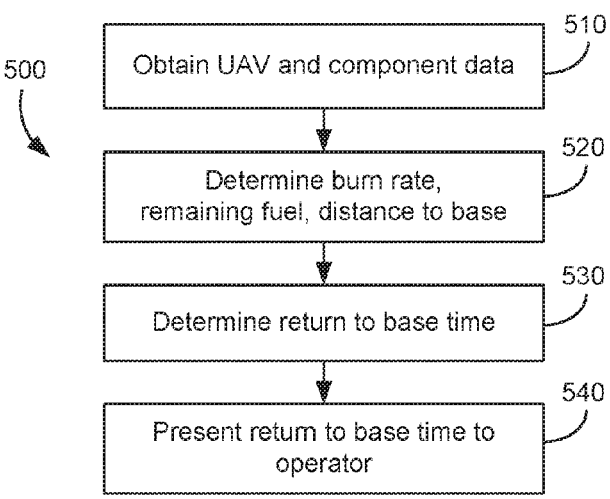
FIG. 5 depicts an illustration of operations performed by one example of the disclosed subject matter.

FIG. 5 illustrates exemplary, non-limiting method 500 of implementing an example of the subject matter disclosed herein. Method 500, and the individual actions and functions described in method 500, may be performed by any one or more devices, including those described herein. In an example, method 500 may be performed by a device or system such as flight planning system 302, on a system configured at a ground station, and/or at a system configured at a UAV, in some examples in conjunction with software configured and/or executing on such a device or system. Note that any of the operations, functions, and actions described in regard to any of the blocks of method 500 may be performed in any order, in isolation, with a subset of other functions and/or actions described in regard to any of the other blocks of method 500 or any other method described herein, and in combination with other functions and/or actions, including those described herein and those not set forth herein. Processor-executable instructions for performing some or all of method 500 may be stored in a memory or other storage device accessible by a processor, such as any processor described herein or otherwise, and may be executed by such a processor to create a device implementing an example of the present disclosure. All such examples are contemplated as within the scope of the present disclosure.

At operation 510, a system performing method 500 may obtain UAV data, which may include data obtained from or relating to one or more components of a UAV, such as an amount of fuel remaining onboard the UAV, flight speed, altitude, engine operating conditions, etc. Geographical and location data may also be determined or obtained, such as a current location of a UAV and a location of the base at which the UAV will refuel. This data may be obtained using any means, including polling or otherwise requesting the data from the UAV and/or its components, receiving such data from the UAV and/or its components that may be configured to automatically provide such data, obtaining information from other sources (such as location or mapping devices), or any combination thereof. At operation 520, using the data obtained at operation 510, a burn rate, remaining fuel, and distance to a base may be determined. Any other calculations or determinations that may be performed to determine a return to base time may also be performed at operation 520. At operation 530, a return to base time may be determined, for example, by determining a current distance from the UAV to a base and determining how long the UAV may loiter at its current location before it must start a flight to return to the base in order to not run out of fuel before reaching the base. At operation 540, the return to base time may be presented to an operator of the UAV.

Figure 6:
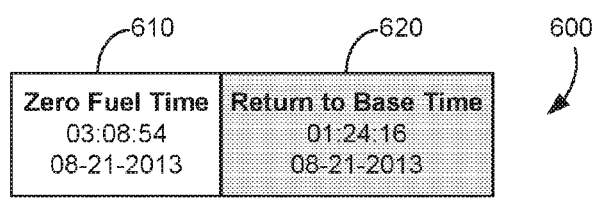
FIG. 6 depicts an illustration of an example display according to the disclosed subject matter.

FIG. 6 illustrates example display 600 that may be presented to an operator to provide zero fuel time data and return to base time data. Display 600 may be presented as a window or as a component of a window having other components. Alternatively, display 600 may be presented on a dedicated display. Display 600 may be presented on multiple displays to multiple operators. Any form of display of zero fuel time data and return to base time data is contemplated as within the scope of the present disclosure.

Display 600 may include zero fuel time section 610 that indicates the zero fuel time as described herein. Zero fuel time may be indicated using any indicators, including a remaining time until fuel is exhausted presented in hours, minutes, and seconds and a date on which the zero fuel time will occur, as shown in section 610. Display 600 may also include return to base time section 620 that indicates the return to base time as described herein. Return to base time may be indicated using any indicators, including a remaining time until the UAV must begin its return to base presented in hours, minutes, and seconds and a date on which the return to base time will occur, as shown in section 620. In an example, return to base time and zero fuel time are displayed proximate to one another so that an operator can easily compare them. In an example, section 610 may be presented with a background color or pattern that differs from that used for section 620. By making these sections contrast using varying colors or backgrounds, as well as in some examples, varying text color, size, and/or type, the sections may be easier to readily identify and compare for an operator.

Figure 7:
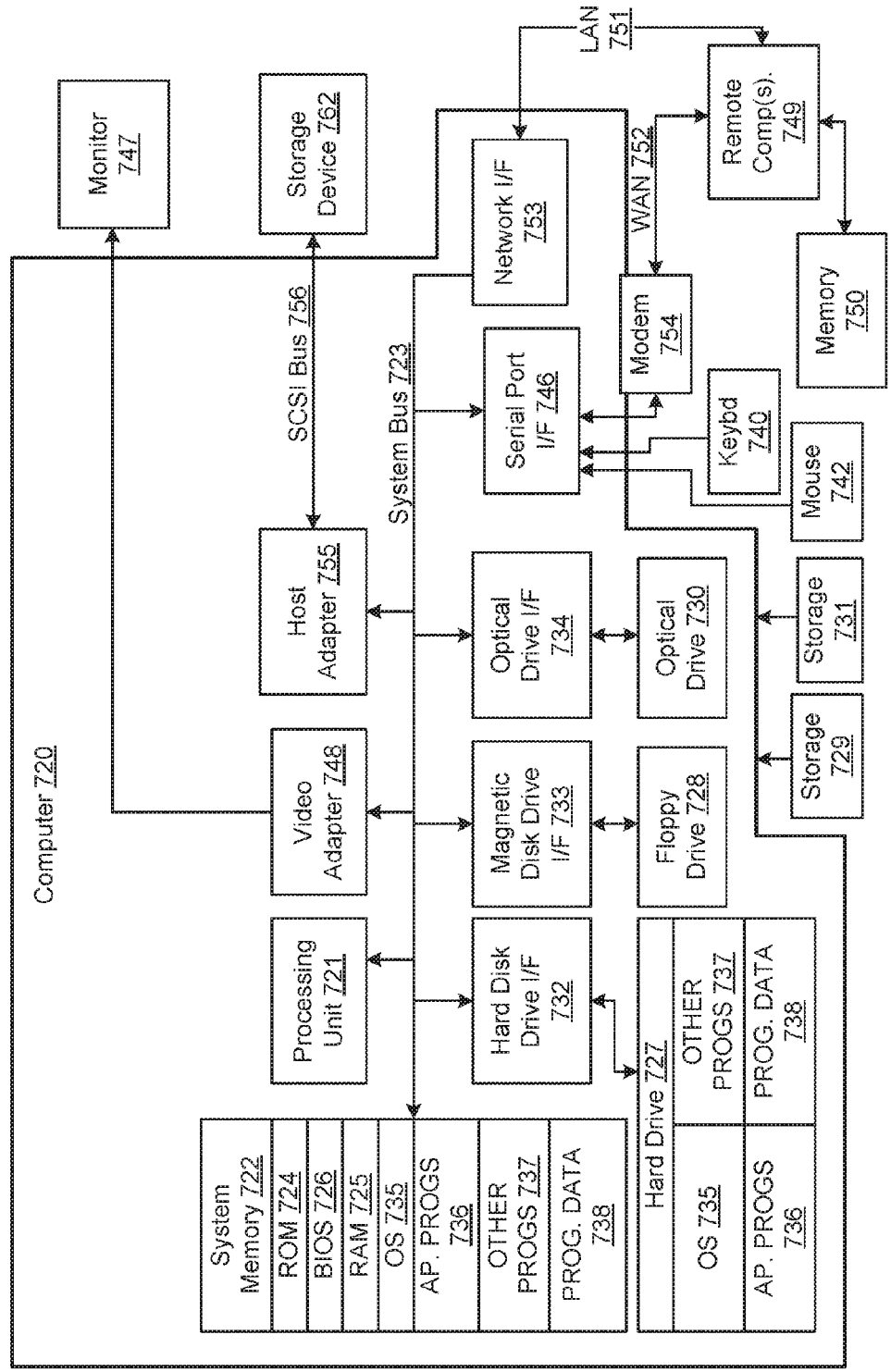
FIG. 7 depicts an illustration of an example computing environment in which operations according to the disclosed subject matter may be performed.

FIG. 7 and the following discussion are intended to provide a brief general description of a suitable computing environment in which the methods and systems disclosed herein and/or portions thereof may be implemented. For example, the functions of server 304, laptop 306, desktop 308, flight planning system 302, and database 326 may be performed by one or more devices that include some or all of the aspects described in regard to FIG. 7. Some or all of the devices described in FIG. 7 that may be used to perform functions of the claimed examples may be configured in other devices and systems such as those described herein. Alternatively, some or all of the devices described in FIG. 7 may be included in any device, combination of devices, or any system that performs any aspect of a disclosed example.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 7 is a block diagram representing a general purpose computer system in which aspects of the methods and systems disclosed herein and/or portions thereof may be incorporated. As shown, the exemplary general purpose computing system includes computer 720 or the like, including processing unit 721, system memory 722, and system bus 723 that couples various system components including the system memory to processing unit 721. System bus 723 may be any of several types of bus structures including a memory bus or memory controller, a peripheral bus, and a local bus using any of a variety of bus architectures. The system memory may include read-only memory (ROM) 724 and random access memory (RAM) 725. Basic input/output system 726 (BIOS), which may contain the basic routines that help to transfer information between elements within computer 720, such as during start-up, may be stored in ROM 724.

Computer 720 may further include hard disk drive 727 for reading from and writing to a hard disk (not shown), magnetic disk drive 728 for reading from or writing to removable magnetic disk 729, and/or optical disk drive 730 for reading from or writing to removable optical disk 731 such as a CD-ROM or other optical media. Hard disk drive 727, magnetic disk drive 728, and optical disk drive 730 may be connected to system bus 723 by hard disk drive interface 732, magnetic disk drive interface 733, and optical drive interface 734, respectively. The drives and their associated computer-readable media provide non-volatile storage of computer-readable instructions, data structures, program modules and other data for computer 720.

Although the example environment described herein employs a hard disk, removable magnetic disk 729, and removable optical disk 731, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 727, magnetic disk 729, optical disk 731, ROM 724, and/or RAM 725, including an operating system 735, one or more application programs 736, other program modules 737 and program data 738. A user may enter commands and information into the computer 720 through input devices such as a keyboard 740 and pointing device 742. Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device may also be connected to the system bus 723 via an interface, such as a video adapter 448. In addition to the monitor 747, a computer may include other peripheral output devices (not shown), such as speakers and printers. The exemplary system of FIG. 7 may also include host adapter 755, Small Computer System Interface (SCSI) bus 756, and external storage device 762 that may be connected to the SCSI bus 756.

The computer 720 may operate in a networked environment using logical and/or physical connections to one or more remote computers or devices, such as remote computer 749, that may represent any of server 304, laptop 306, desktop 308, flight planning system 302, and database 326. Each of server 304, laptop 306, desktop 308, flight planning system 302, and database 326 may be any device as described herein capable of performing the determination and display of zero fuel time data and return to base time data. Remote computer 749 may be a personal computer, a server, a router, a network PC, a peer device or other common network node, and may include many or all of the elements described above relative to the computer 720, although only a memory storage device 750 has been illustrated in FIG. 7. The logical connections depicted in FIG. 7 may include local area network (LAN) 751 and wide area network (WAN) 752. Such networking environments are commonplace in police and military facilities, offices, enterprise-wide computer networks, intranets, and the Internet.

When used in a LAN networking environment, computer 720 may be connected to LAN 751 through network interface or adapter 753. When used in a WAN networking environment, computer 720 may include modem 754 or other means for establishing communications over wide area network 752, such as the Internet. Modem 754, which may be internal or external, may be connected to system bus 723 via serial port interface 746. In a networked environment, program modules depicted relative to computer 720, or portions thereof, may be stored in a remote memory storage device. It will be appreciated that the network connections shown are exemplary and other means of establishing a communications link between computers may be used.

Computer 720 may include a variety of computer-readable storage media. Computer-readable storage media can be any available tangible, non-transitory, or non-propagating media that can be accessed by computer 720 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 720. Combinations of any of the above should also be included within the scope of computer-readable media that may be used to store source code for implementing the methods and systems described herein. Any combination of the features or elements disclosed herein may be used in one or more examples.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining fuel status of an unmanned aerial vehicle, comprising:
   determining a zero fuel time based on a fuel burn rate of the unmanned aerial vehicle and a remaining amount of fuel of the unmanned aerial vehicle;
   determining a return to base time based on a location of the unmanned aerial vehicle and a location of a base; and
   providing the zero fuel time and the return to base time for controlling the unmanned aerial vehicle.

2. The method of claim 1, further comprising presenting the zero fuel time to an operator of the unmanned aerial vehicle on a display.

3. The method of claim 1, further comprising presenting the return to base time to an operator of the unmanned aerial vehicle on a display.

4. The method of claim 1, determining at least one of a flight speed, an altitude, and an engine operating condition of the unmanned aerial vehicle; and
   wherein determining the zero fuel time is further based on the at least one of the flight speed, the altitude, and the engine operating condition of the unmanned aerial vehicle.

5. The method of claim 1, further comprising at least one of a flight speed, an altitude, and an engine operating condition of the unmanned aerial vehicle; and
   wherein determining the return to base time is further based on the at least one of the flight speed, the altitude, and the engine operating condition of the unmanned aerial vehicle.

6. The method of claim 1, wherein determining the zero fuel time and determining the return to base time are performed at a ground station.

7. The method of claim 1, wherein determining the zero fuel time and determining the return to base time are performed at the unmanned aerial vehicle.

8. A flight planning system for controlling an unmanned aerial vehicle, comprising:
   a memory comprising instructions; and
   a processor coupled to the memory that, when executing the instructions, effectuates operations comprising:
   determining a zero fuel time based on a fuel burn rate of the unmanned aerial vehicle and a remaining amount of fuel of the unmanned aerial vehicle; and
   determining a return to base time based on a location of the unmanned aerial vehicle and a location of a base.

9. The flight planning system of claim 8 wherein the operations further comprises presenting the zero fuel time and return to base time to an operator of the unmanned aerial vehicle on a display.

10. The flight planning system of claim 9 wherein the zero fuel time is displayed proximate to the return to base time.

11. The flight planning system of claim 8, wherein the operations further comprise determining at least one of a flight speed, an altitude, and an engine operating condition of the unmanned aerial vehicle; and
   wherein the operation of determining the zero fuel time is further based on the at least one of the flight speed, the altitude, and the engine operating condition of the unmanned aerial vehicle.

12. The flight planning system of claim 8, wherein the operations further comprise determining at least one of a flight speed, an altitude, and an engine operating condition of the unmanned aerial vehicle; and
   wherein the operation of determining the return to base time is further based on the at least one of the flight speed, the altitude, and the engine operating condition of the unmanned aerial vehicle.

13. The flight planning system of claim 8, wherein the fuel burn rate is calculated from data regarding a condition and status of the unmanned aerial vehicle.

14. The flight planning system of claim 9, wherein presenting the zero fuel time comprises presenting hours, minutes, seconds, and a date on which the zero fuel time will occur, and wherein presenting the return to base time comprises presenting hours, minutes, seconds, and a date on which the return to base time will occur.

15. A non-transitory computer-readable storage medium comprising computer executable instructions that, when executed by a processor, effectuate operations comprising:
   determining a zero fuel time based on a fuel burn rate of an unmanned aerial vehicle and a remaining amount of fuel of the unmanned aerial vehicle; and
   determining a return to base time based on a location of the unmanned aerial vehicle and a location of a base.

16. The non-transitory computer-readable storage medium of claim 15 further comprising the operation of presenting the zero fuel time to an operator of the unmanned aerial vehicle on a display.

17. The non-transitory computer-readable storage medium of claim 15 further comprising the operation of presenting the return to base time to an operator of the unmanned aerial vehicle on a display.

18. The non-transitory computer-readable storage medium of claim 15, further comprising the operation of determining at least one of a flight speed, an altitude, and an engine operating condition of the unmanned aerial vehicle; and
   wherein the operation of determining the zero fuel time is further based on the at least one of the flight speed, the altitude, and the engine operating condition of the unmanned aerial vehicle.

19. The non-transitory computer-readable storage medium of claim 15, further comprising the operation of determining at least one of a flight speed, an altitude, and an engine operating condition of the unmanned aerial vehicle; and
   wherein the operation of determining the return to base time is further based on the at least one of the flight speed, the altitude, and the engine operating condition of the unmanned aerial vehicle.

20. An unmanned aerial vehicle comprising:
   a memory comprising instructions; and
   a processor coupled to the memory that, when executing the instructions, effectuates operations comprising:
   determining a zero fuel time based on a fuel burn rate of the unmanned aerial vehicle and a remaining amount of fuel of the unmanned aerial vehicle; and
   determining a return to base time based on a location of the unmanned aerial vehicle and a location of a base.

* * * * *